July 29, 1969  C. A. BARRERE, JR  3,457,705

GAS CHROMATOGRAPHY PROCESS

Filed April 20, 1967

INVENTOR.
CLEM A. BARRERE, JR
BY
ATTORNEY

United States Patent Office 3,457,705
Patented July 29, 1969

3,457,705
GAS CHROMATOGRAPHY PROCESS
Clem A. Barrere, Jr., Ponca City, Okla., assignor to Continental Oil Company, Ponca City, Okla., a corporation of Delaware
Filed Apr. 20, 1967, Ser. No. 632,237
Int. Cl. B01d *13/00, 53/00*
U.S. Cl. 55—67
6 Claims

ABSTRACT OF THE DISCLOSURE

A method of improving the resolution of difficulty separable components of a vaporizable mixture by displacing the vaporized mixture through a chromatography column with a substantially continuously flowing carrier gas. The carrier gas used comprises a mixture of a gas which is preferably not corbed on the column packing or substrate, and an amount of one of the difficulty separable components of the mixture. The carrier gas mixture is flowed through the column in advance of the introduction to the column of the mixture to be separated into its components so that a state of at least near equilibrium is attained between the component of the mixture in the advance flowing carrier gas, and this component adsorbed on the column substrate.

BACKGROUND OF THE INVENTION

Field of the invention

This invention relates to gas chromatography processes. More specifically, the invention relates to a method for improving the extent to which components of a vaporized sample can be resolved or separated from each other by use of a gas chromatography column.

Description of the prior art and summary of the invention

As is well understood by those skilled in the art of gas chromatography, there are many multicomponent mixtures which are only difficultly separable into the several components by this technique, or which cannot be satisfactorily separated at all on presently known chromtographic columns. In instances where a given sample mixture has proved to be poorly resolved into its components by passing through a packed column containing a particular solid or liquid substrate material, efforts to improve resolution have generally taken the form of either providing a different, and hopefully more effective, substrate, or of changing the temperature at which the vaporized mixture is introduced to, and passed through the column, or of changing the column geometry. As indicated above, there are occasions when none of these alternatives effects significant improvement in the efficiency of separations, thus requiring the discard of the gas chromatography technique as a satisfactory solution to the problem of separation. Even where improvement in resolution is realized, however, the price paid, in terms of cost of exotic substrate materials or more expensive operating conditions, sometimes effectively makes the chromatography technique infeasible by contrast with more economic procedures.

The present invention proposes a new method for separating mixtures by the use of the gas chromatography technique. The method entails a new approach to the problem of improving the extent to which vaporized mixtures of components which are otherwise only difficulty separable, or even inseparable, can be realized on a chromatographic column containing a solid substrate, or a substrate comprising a solid having a liquid distributed on the surface thereof. The process of the present invention may be broadly described as comprising introducing to a carrier gas used to move the injected sample mixture through the column, at least one of the components of the sample mixture, with such introduction to the carrier gas being on a substantially continuous basis during flow of the carrier gas through the column, or at least for a sufficient period of time preceding and during the sample injection to permit a condition of phase equilibrium to obtain in the column at the time that the mixture enters the column. As here used, the term phase equilibrium connotes a condition in the column and over substantially its entire length in which that portion of the mixture component added to the carrier gas which is in the gas phase is substantially in equilibrium with that portion of the added component which is retained by sorption forces on the substrate.

I have determined that the addition of one of the components of the mixture to be resolved to the carrier gas under the prescribed conditions very effectively enhances the resolving power of the column. Further than this, by the controlled introduction to the carrier gas of certain predetermined amounts of the added component, the retention times in the column of the several components of the mixture can be controlled so as to provide a desired degree of separation, or, in other instances, a desired overall processing time for displacing the sample through the chromatographic column.

The conceptual tools with which the problem of mixture resolution may be solved in the manner in which I here propose to solve it have been previously at hand, although these underlying concepts have previously been used for other purposes. It is believed that a better understanding and appreciation of the invention will be conveyed if certain mathematical and physical relationships heretofore recognized are briefly reviewed, conjunctively with a brief description of the practical utilization which has previously been made of these concepts.

It has heretofore been desirable in various practical applications to evaluate the extent to which a particular gaseous material may be sorbed on a particular substrate material. This data, for example, has been found useful in designing and predicting the performance of rectification columns. One technique for obtaining such data relative to substrate sorption has been by development of an equilibrium curve or so-called sorption isotherm in which the quantity of the gas sorbed on the substrate material is plotted against the non-sorbed quantity of this gas of interest in a mixture thereof with another gas which is preferably not sorbed on the substrate when such mixture has been moved over the substrate until a condition of equilibrium is reached. The sorption isotherm can be developed empirically using appropriate measuring devices, and once enough data points are obtained to permit the curve to be drawn, it can be used to determine the extent to which the gas of interest will be adsorbed on that particular substrate and at that particular temperature, at any desired concentration of the gas under consideration in the inert gas.

Recently it was determined that when two or more sorbed components of a gaseous mixture are displaced through a zone containing a sorptive substrate by a gas containing a known amount of one of the sorbed components, the velocities of the one sorbed component and another sorbed component can be mathematically related to the extent to which the two components will be sorbed on the substrate. By the use of these mathematical relationships it is possible to calculate the extent to which a gaseous material will be sorbed on a given substrate at a given temperature when the gaseous material is entrained with an inert, non-sorbed carrier gas until equilibrium over the substrate is reached. The only observed data needed to set up and complete the calculations are the velocities of movement over the substrate of the gaseous material of interest and a second gaseous material which are introduced to the inert carrier gas as a finite sample mixture and moved by the carrier gas over the substrate and in contact therewith. More simply, the retention times of the gaseous components of the mixture (that is, the gas of interest and a second gaseous component of the mixture) over the sorbing substrate need only be known in order to permit the extent of sorption of each on the substrate to be calculated.

The retention times of the components in a sorbent-containing column (or the retention volumes) can also be mathematically related to the equilibrium partition coefficients, K, for the components in the flowing phase, and thus constitute an easily measured basis for determining these coefficients for various systems.

In regard to these prior utilizations of retention time values, or so called perturbation velocities, for obtaining various sorption isotherm data, reference is made to the paper by Stalkup and Deans appearing in the Journal of the American Institute of Chemical Engineers, January 1963, page 106, and to the paper of Peterson et al. appearing in the same journal, volume 12, No. 5, September 1966, page 903.

The mathematics which relates retention times of components to the extent of sorption on the substrate material, and to equilibrium partition coefficients of the gaseous components involved can be utilized to mathematically establish the nonequality of retention times for plural components when passed through a chromatographic column under the foregoing described conditions, even though the same components would have substantially the same retention times, and they would not be resolved, if simply injected into the column in a continuously flowing stream of carrier gas which did not contain any of these components. Stated in another way, I have observed that it can be mathematically proven that where a finite quantity of one component of a binary mixture is made a part of a carrier gas which is continuously passed through a chromatographic column to the extent that equilibrium is established between the flowing and fixed phases (sorbing substrate), the other portion or component of such binary mixture will emerge from the column at a different time from the one component after the mixture has been injected into the carrier gas stream to form a pulse or perturbation in the column, even though when the same mixture is injected into a carrier gas stream which does not include either component, the times of emergence would be substantially the same and thus no useful separation would be effected. This mathematical proof has been experimentally verified by the effective separation, by the use of this method, of a vaporous mixture otherwise substantially inseparable by gas chromatography as heretofore practiced.

From the foregoing description of the invention, it will have become apparent that a major object of the invention is to provide a method for improving the extent to which a vaporized mixture of a plurality of components can be resolved into its individual components by passing the mixture through a chromatographic column.

An additional object of the invention is to provide a method for controlling in a predictable manner, the extent to which the components of a gaseous mixture are resolved when passed through a chromatographic column, and the various retention times of the components in the column.

Another object of the invention is to provide a method for separating two or more components of a vaporized mixture upon a chromatography column and under conditions of temperature and pressure which could not be used to achieve such separation by any other method in which the structure of column, temperature and pressure were unchanged.

In addition to the foregoing objects, additional objects and advantages will become apparent as the following detailed description of the invention is read in conjunction with the accompanying drawings which are explanatory of certain aspects of the invention and the manner in which it is practiced.

Description of preferred embodiments of the invention

Figure 1:
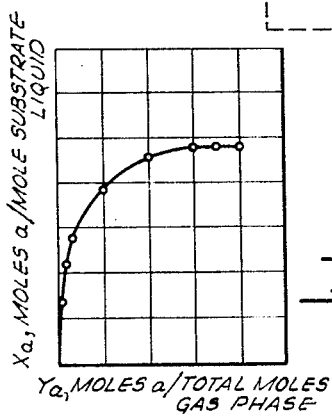
FIGURE 1 is a graphical portrayal of a typical sorption isotherm.

Before discussing the specific steps utilized in practicing the invention, it is believed that the significance of the invention may be more fully appreciated if the mathematical proof of its effectiveness is first demonstrated. In FIGURE 1 a typical sorption isotherm is depicted. Here, for a system in which a single material, A, on a plurality of occasions is moved through a liquid sorbent-containing chromatography column by a continuously flowing carrier gas which contains varying amounts of component A on the different occasions, the quantity of A which is sorbed on the substrate at equilibrium $X_A$, is plotted against the quantity of A in the vapor phase over the sorbing substrate, $Y_A$.

In this type of sorption isotherm plot, several values are well defined and well understood in the art. Thus, $K_A$, identified as the equilibrium or distribution constant, is the value of the slope of the equilibrium curve at the zero intercept—that is, when the carrier gas contains none of the component A. It is also well understood that where $X_A$ in the plot is the quantity of the component A which is sorbed on the liquid substrate at equilibrium (given in, say, moles of A per total moles of substrate liquid), and $Y_A$ is the quantity of the sorbed component which is not sorbed and is in the gas phase (expressed, for example, as moles of A per total moles of gas over the substrate), the relationship of $X_A$ to $Y_A$ can be mathematically expressed as $Y_A = K_A \gamma X_A$ where $\gamma$ is a so-called activity coefficient and is characteristic of the particular system under consideration. When $Y_A$ approaches 0 (or infinite dilution in the carrier gas used to move it across the substrate), $\gamma$ approaches 1, and $X_A$ approaches 0.

In a system in which a carrier gas containing an amount of a material A and an inert (non-sorbed) gas is used to displace a mixture of A and a second material B, in pulse form through the column (as where a small sample of the mixture is injected into the carrier gas), the velocity $W_A$, at which the perturbation or peak due to component A is moved through the column may be related to the velocity V of the carrier gas through the column by the equation:

(1)
$$W_A = \frac{V}{1 + \frac{1 - Y_A}{N_g} \frac{dX_A}{dY_A}}$$

where $N_g$ is the total moles of gas (inert gas $+ A + B$) in the column over the substrate, and $X_A$ and $Y_A$ are as hereinbefore described.

The velocity $W_B$, of the perturbation or peak due to component B of the injected mixture can be related to the carrier gas velocity V, by the equation (2)
$$W_B = \frac{V}{1 + \frac{X_B}{N_g Y_A}}$$

where $X_B$ is the amount of component B sorbed on the substrate in the column, and $N_g$ and $Y_A$ are as hereinbefore defined. It can be shown that for relatively small values of $Y_A$, that is where a relatively small amount of component A is added to the carrier gas, the expression $$1 + \frac{X_B}{N_g Y_A}$$

is a closed approximation of the expression $$1+\frac{X_A}{N_g Y_A}$$

and from this it will be apparent that when $Y_A$ is a finite value, that is when the component A is included in a finite amount in the carrier gas, $W_A$ and $W_B$ must necessarily be different. If the velocities of the components A and B peaks through the column are different, their retention times are necessarily different, and separation is thus effected.

As contrasted with the situation in which a finite amount of component A is included in the constantly flowing carrier gas and $Y_A$ therefore has a finite value, it can be shown that when there is no component A included in the carrier gas (infinite dilution), $Y_A$ is 0, and as the 0 value is approached, Equations 1 and 2 reduce to (3) $$W_A = \frac{V}{1+\frac{1}{N_g K_A}}$$

and (4) $$W_B = \frac{V}{1+\frac{1}{N_g K_B}}$$

respectively, where $K_A$ and $K_B$ are the respective distribution constants of component A and component B on the substrate. These constants will be substantially identical in the case of two components absorbed on the substrate to substantially the same degree. Thus, the components A and B have the same velocity (i.e., $W_A = W_B$) through the column and are not resolved by passage through the column when the carrier gas is a non-sorbed material containing no finite amount of component A. The same relationships hold when the component B is considered to be the component added to, or excluded from, the carrier gas. In other words, either component of the mixture can be added to the carrier gas to give the desired separation of the two mixed components by passage of the mixture through the column.

It is possible also to develop mathematical proof of the occurrence of the separation phenomena (as described above with reference to the use of a non-sorbed or inert gas in the carrier gas) when a carrier gas is used which includes, in addition to the finite amount of one of the components to be separated, another gas which is not inert in the sense of not being sorbed on the column substrate. Thus, the generality of the separatory effect of adding to the carrier gas, whether inert or sorbed on the substrate, a small yet finite amount of one of the components of the mixture to be separated can be mathematically verified. In other words, the mathematical relationships clearly demonstrate that where a finite quantity of one of the components of a mixture is made a part of the continuously flowing carrier gas, and a condition of equilibrium is reached in the column prior to sample introduction, the velocities of the peaks or pulses of the two components of the mixture through the column will necessarily be different. This is true even though by virtue of having substantially the same equilibrium constant K, relative to the substrate, the two components will have the same velocity through the column when neither is present in a finite amount in the continuously flowing carrier gas, and thus no resolution is then effected.

If Equations 1 and 2 are now considered, and it is recalled that for relatively small values of $Y_A$, $X_A$ may be substituted for $X_B$ in Equation 2, it can be seen that by experimentally developing an absorption isotherm plot for component A similar to that shown in FIGURE 1, this plot may then be used to permit values of $W_A$ and $W_B$ to be closely predicted for the various values of $Y_A$ and $X_A$ taken from the isotherm. The value of V (carrier gas velocity) is, of course, a constant for all values of $Y_A$. The calculated velocity $W_B$, of the peaks of component B through the column will be, of course, only a close approximation of the true value of this velocity since $X_B$ is not precisely equal to $X_A$ in the system described. Since the component velocities $W_A$ and $W_B$, are directly related to retention times of the component peaks in the column, it is therefore possible to pre-establish by the use of the described absorption isotherm and Equations 1 and 2, how much of the component A should be included in the continuously flowing carrier gas in order to provide certain desired retention times for the components A and B. The extent to which these components are resolved by the column can thus be controlled, as can the overall time for passage of the mixture through the column.

Figure 2:
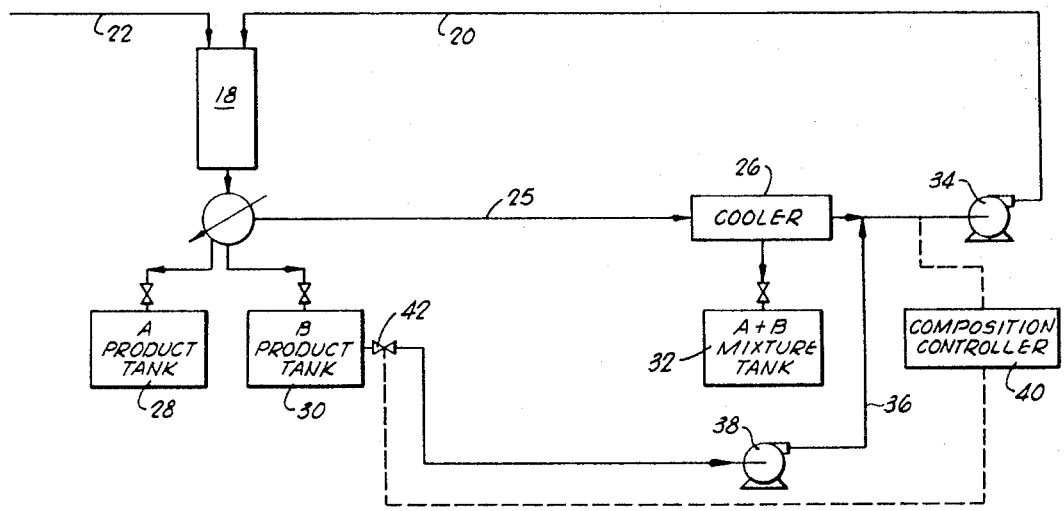
FIGURE 2 is a schematic flow diagram depicting one way in which the method of the present invention can be used to separate the components of a binary system.

One arrangement of apparatus which can be employed in practicing the method of the present invention is depicted in FIGURE 2 of the drawings. The depicted system can typically be used for chromatographically separating a binary mixture. More accurately, perhaps, the system may be described as useful for accomplishing a binary separation, since the function of the method of the invention is actually to resolve otherwise difficultly separable portions of a vaporous mixture, and each of these portions can in turn contain a plurality of components. In the illustrated apparatus, solid flow lines represent pipes or conduits suitable for conveying a gas from one location to another. The dashed line is used to represent the path of electrical or mechanical control signals used for operating and controlling the apparatus.

A chromatographic column 18 containing a typical sorbing substrate material is connected to a carrier gas stream 20 and is fitted to receive an injected finite sample from a suitable sampling line 22. It should be observed that the sample can also be injected directly into the carrier gas just upstream from the column 18 if desired. The effluent from the column 18 is passed through a suitable switching valve which can be manually or automatically switched in operation. The switching valve can thus be alternately used to direct the carrier gas via a conduit 25 to a cooler 26 or other suitable separating device functioning as hereinafter described, or the valve may be used to direct separated portions or components of the sample mixture into a plurality of product tanks 28 and 30.

The cooler 26 functions to remove any residual, unresolved sample mixture from the carrier gas stream and direct it to a storage tank 32 while permitting the carrier gas to pass on to a suitable pump 34 by which it is recycled to the chromatographic column 18. A small amount of the separated component from product tank 30 is passed through a conduit 36 by a metering pump 38 and is introduced to the carrier gas just upstream from the pump 34. A suitable composition controller 40 functions to continuously sense the composition of the carrier gas stream downstream from the point of introduction of the separated component from conduit 36, and to automatically control this composition through a suitable solenoid control valve 42 or any other suitable device.

To explain the use of the depicted system in practicing the method of the present invention, it must be assumed first that the chromatographer is faced with the problem of separating a mixture AB into its components A and B, and that by mere displacement of this mixture through the column with an available carrier gas, no suitable resolution of the mixture can be effected. In other words, when the mixture AB is injected into the column and displaced therethrough with a carrier gas such as helium or nitrogen, the components A and B emerge from the column at substantially the same time, no significant separation having been effected in the column.

In the practice of the process of the present invention, resolution of the mixture AB into its components A and B by passage of the mixture through the column can be caused to occur. This is accomplished in accordance with the invention by using a carrier gas which contains a substantially constant and finite amount of either component A or component B or both, and another gas differing from A and B—preferably an inert, non-sorbed gas. When this procedure is followed, the foregoing mathematical relationships indicate that the velocities of the components A and B through the column must necessarily be different, and this is bourne out by the specific examples hereinafter set forth.

In the flow diagram depicted in FIGURE 2, let it be assumed that an inert gas contains a finite and constant amount of component B intimately mixed therewith, and that this mixture is flowed continuously through the column. Flow is continued for a sufficient period of time before sample injection to permit equilibrium to be established in the column between the flowing gas phase and the sorbing column substrate. The sample of mixture AB which is to be resolved is then injected into the column (as shown) or into the flowing carrier gas. The result of the phenomena hereinbefore described is then to cause a variation to exist between the velocities at which the mixture components A and B move through the column. The components therefore are separated and have different retention times in the column and emerge in sequence. By the use of the switching valve, the sequentially emerging components A and B can be separately directed to the product tanks 28 and 30. Before, between and following emergence of the components from the column, the switching valve will direct the carrier gas to the cooler 26 which is provided for the purpose of condensing out any residual A or B which may be entrained in the carrier gas in small quantities, and for directing these condensed components to the storage tank 32. The inert gas portion of the carrier gas is then drawn toward the pump 34 which functions to recycle it to the column.

Just upstream from the pump 34, a constant amount of component B is added back from the conduit 36 to the flowing stream of inert gas. The amount of component B which is added to the inert gas to make up the composite carrier gas used in the process is drawn from the tank 30 through the conduit 36 by the metering pump 38. A solenoid control valve 42 positioned in the conduit 36 is automatically controlled in its setting by the composition controller 40 which continuously senses the composition of the carrier gas stream containing the inert carrier gas and the added back constant amount of component B.

The mixture of inert gas and component B is recycled to the top of the chromatographic column 18 through the conduit 20. The system is now operated by continuously recycling to the column 18 a carrier gas which contains an inert gas and a small, constant amount of component B. The composite carrier gas so recycled maintains the column 18 at an equilibrium condition in which the moving gas phase is in equilibrium with the stationary phase. A sample mixture which includes an intimate mixture of the components A and B can then be introduced to the column 18 and, in accordance with the process of the present invention, will be resolved into the components A and B, with component A being directed to the product tank 28 and component B being sequentially directed to the product tank 30.

It should be pointed out that as a means of startup preparatory to sample introduction, an amount of component B may be located in the product tank 30 and withdrawn therefrom through the conduit 36 and introduced to a flowing carrier gas stream which originates anywhere upstream from the junction of the conduit 36 with the line which connects the cooler 26 with the pump 34. After this mixture of carrier gas and component B has been flowed through the column until the column reaches equilibrium, the sample mixture can be injected into the column and separation of its components successfully effected.

It should also be further pointed out that rather than adding back the component B to the insert gas portion of the carrier gas, a constant mole fraction of component A can be introduced to the carrier gas, and complete separation of the two components of the mixture achieved in the same manner as when a constant amount of component B is added back. Another variation in the process which effectively results in the described separation would be the continuous addition to the carrier gas of a constant mole fraction of a mixture of both components C and D. This arrangement would have the advantage of permitting the cooler 26 to be eliminated in many situations. Of course, if C and D are liquids at atmospheric pressure and ambient temperatures, there must necessarily be some means for vaporizing the liquid component or components before they are reinjected into the stream of inert gas to formulate the carrier gas composition in which the added back component is a constant mole fraction of the total composition.

Figure 3:
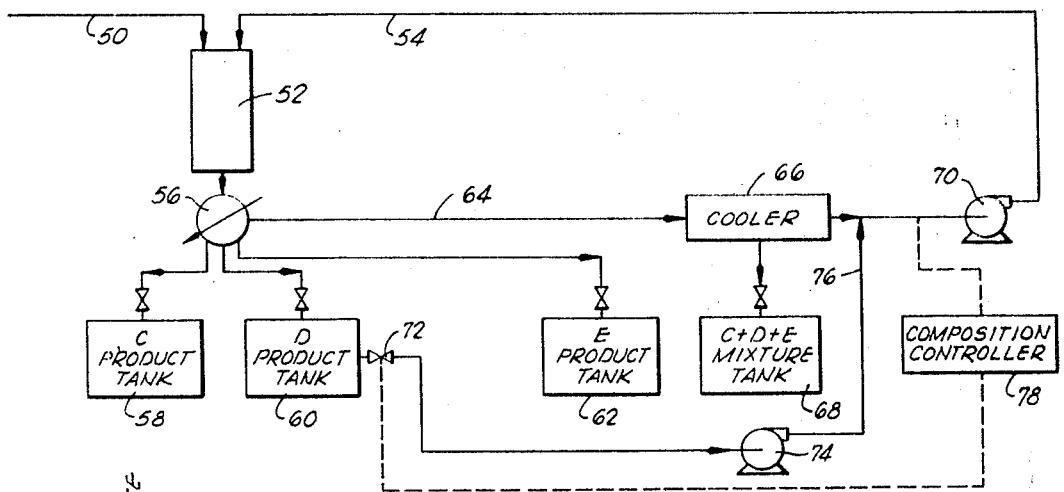
FIGURE 3 is a schematic flow diagram depicting one way in which the method of the present invention can be used to separate the components of a ternary system.

In FIGURE 3 of the drawings a flow system is depicted which may be utilized effectively for accomplishing a ternary separation—that is, a separation of a gaseous mixture into at least three portions which otherwise could not be separated on the column used in the depicted system. In this system, as in the system depicted in FIGURE 2, a sample inlet line or conduit 50 is provided for feeding the sample mixture to be resolved into a chromatographic column 52. A carrier gas line 54 is also provided for introducing carrier gas to the column. As previously stated, an alternate arrangement to that which is illustrated would be to provide for injection of the sample mixture directly into the carrier gas immediately prior to its introduction to the column. A switching valve 56 is provided in the discharge conduit from the column 52 and functions by a sequential switching operation, to direct components separated on the column to one of three product tanks 58, 60 and 62. Before, between and after the times when the switching valve 56 is being used to direct the several components to their respective product tanks, the switching valve is used to direct the carrier gas through a conduit 64 to a cooler 66. Any residual portion of the sample mixture introduced to the column can be condensed in the cooler 66 and directed to a residual mixture collection tank 68. A recirculating pump 70 receives carrier gas from the cooler 66 and recycles the carrier gas through the conduit 54 to the chromatographic column 52.

Provision is made for withdrawing a part of the product from product tank 60 through a suitable electrically operated solenoid metering valve 72 by means of a metering pump 74, and for reintroducing a finite amount of this component from a conduit 76 to the carrier gas stream. A composition controller 78 is provided for sensing the composition of the carrier gas downstream from the point where a finite amount of one of the components is added back to the inert gas, and for controlling, in correspondence to the sensed composition, the solenoid metering valve 72 to control the amount of the added back component which is withdrawn from the product tank 60.

In the use of the system depicted in FIGURE 3, let it be assumed that a three component mixture CDE, is to be separated on the chromatographic column 52. Let it further be assumed that if only a pure, inert carrier gas, such as helium, is utilized for displacing the mixture through the column, as is the case with conventional chromatography as heretofore practiced, then component E will be separated from components C and D, but there will be no separation effected between C and D. By the use of the process of the present invention, however, a complete separation of all three components can be achieved. Thus, by providing a constant mole fraction of component D in the carrier gas stream, all three of the components are caused to be effectively separated on the column, and the switching valve may be utilized to direct the three components to their respective product tanks. The same result could also be achieved by using a carrier gas which contained a constant mole fraction of component C withdrawn from product tank 58. The same is true of the continuous introduction to the carrier gas of a constant amount of product E, or of any combination of the three components of the mixture.

By the use of the process of the present invention, as the number of mixture components which are to be separated increases, the possibilities of combinations of constant component concentrations in the carrier gas also increase. The appropriate and best carrier gas composition to use can easily be determined in the laboratory on a laboratory chromatograph. The basic principle of the present process of reinjecting a controlled amount of one or more of the product components into the carrier gas such that the column operates with a constant amount of such components in the overall gas carrier composition will be effective to achieve separation of any otherwise unresolved peaks.

The physical explanation for the separation phenomena which results from the practice of the present invention is that when a finite concentration of one of the components of the mixture to be separated is made a part of the carrier gas which is moved through the column until equilibrium is established therein, then, from equilibrium considerations, there will be a finite concentration also of the molecules of that particular component in (or on) the stationary phase of sorbent material in the column. The physical system which then confronts the injected sample has been changed, and will necessarily alter the retention times of the components of the composition. Usually, the effect of adding back a particular component to the carrier gas will be to decrease the retention time in the column of that particular component of an injected mixture because of the dynamic interchange occurring between the moving gas and the stationary phase. The same separation will also occur if there is a reversible reaction occurring in a liquid phase on the solid support (as where a liquid substrate is the sorbing material).

It should also be reiterated that the mathematical explanation of the phenomena which is involved in the present invention, as it has been hereinbefore described, will permit one, by the use of such mathematics, to predict retention times of the components of a mixture from the amount of one of the components which is entrained in the carrier gas. That is to say, that by the use of the mathematical relationships hereinbefore set out, one may tailor the retention times or pulse velocities of the components of a mixture through the column to achieve a desired degree of resolution, or a particular overall time for processing the sample through the column. This is done by adjusting the amount of one or more of the components which is added to the carrier gas stream used to displace the mixture through the column.

It should be noted, before passing on to the examples which are hereinafter set forth, that the separatory effect achieved by the continuous inclusion of a finite amount of one of the mixture components in the carrier gas will result even though such component is not added on a constant or continuously identical basis. In other words, the same equilibrium phenomena which results in separation being effected when a constant amount of one of the components of the mixture is included in the carrier gas will occur on a shifting basis when an inconstant or changing amount of the one component is included in the constantly flowing carrier gas. The use of a constant amount of the added back component, however, is much preferred, since much better predictability of retention times and greater ease of practice of the invention occur when such constant composition of the carrier gas is utilized.

In order to further explain and clarify the utilization of the process of the present invention in the separation of various gaseous mixtures otherwise difficult or impossible to separate, a number of examples of the utilization of principles underlying the present invention to effect separation of certain otherwise inseparable (by chromatography) radioisomers are hereinafter set forth.

Example 1

A chromatographic column 10 inches in length and 0.18 inch in diameter was packed with 2.293 grams of silica gel, and a mixture of non-radioactive propane and radioactive propane ($C_{14}$ tagged) was injected into helium carrier gas passed continuously through the column. The column was retained at a temperature of 40° C. and a pressure of 20 p.s.i.a. No separation of the radioactive propane from the non-radioactive species occurred.

Increasing amounts of non-radioactive propane were then successively introduced to the flowing helium gas, in each case on a continuous basis, and the carrier gas mixture thus produced with each introduction was permitted to flow through the column until an equilibrium condition was achieved. Then, using the respective flowing mixtures of the helium and non-radioactive propane as the carrier gas, the sample mixtures of radioactive and non-radioactive propane were injected into the carrier gas after the reaching of equilibrium within the column in each instance. The retention times for the radioactive and non-radioactive propane isotopes corresponding to the several carrier gas compositions utilized are tabulated in Table I. The relative amounts of non-radioactive propane and helium in the carrier gas are expressed as mole percentages.

TABLE I

| Carrier gas composition, mole percent | | Retention time, minutes | |
|---|---|---|---|
| Helium | Non-radioactive $CH_3$ | Radioactive $CH_3$ | Non-radioactive $CH_3$ |
| 1.0000 | 0.0000 | 24.73 | 24.73 |
| 0.9006 | 0.0994 | 14.50 | 9.25 |
| 0.8373 | 0.1627 | 12.27 | 6.84 |

Example 2

A chromatographic column 237 inches long and 0.05 inch in diameter of the capillary type was internally coated with about 0.05 gram diethanolamine. Nitrogen carrier gas was passed through the column at a temperature of 105° C. and a pressure of about 760 mm. Hg, and from time to time, a mixture of radioactively labeled carbon dioxide and non-radioactive carbon dioxide was introduced to the carrier gas stream and passed through the column. Between the consecutive introductions of the samples to the carrier gas, the composition of the flowing carrier gas was altered by the introduction thereto for continuous flow therewith of increasing amounts of carbon dioxide (non-radioactive).

At each new composition of the flowing carrier gas (nitrogen and carbon dioxide) flow was continued prior to sample injection long enough for equilibrium to be achieved in the column between the liquid substrate and the flowing vapor phase. The retention times of the two components of the sample (carbon dioxide and its radioactive isotope) were measured for all sample injections. The results obtained are set forth in Table II.

TABLE II

| Carrier gas flow rate, cc./min. | Carrier gas composition, mole percent | | Retention time, Minutes | |
|---|---|---|---|---|
| | $N_2$ | Non-radioactive carbon dioxide | Non-radioactive carbon dioxide | Radioactive carbon dioxide |
| 6.41 | 100 | 0 | 2.56 | 2.57 |
| 3.89 | 90 | 10 | 3.39 | 3.72 |
| 3.36 | 75 | 25 | 3.44 | 4.11 |
| 4.86 | 60 | 40 | 2.17 | 2.74 |
| 4.05 | 37.5 | 62.5 | 2.29 | 3.34 |

Example 3

A column 90.3 cm. in length and 0.53 cm. in diameter was packed with a nickel-kieselguhr substrate material. A sample mixture of radioactive and non-radioactive ethane were passed through the column at a temperature of 40° C. and a pressure of 785 mm. Hg using a carrier gas which consisted of hydrogen containing various amounts ethane in the manner described in the previous examples. The retention times of the ethane radioisomers were measured, and the data are tabulated in Table III.

TABLE III

| Carrier gas flow rate, cc./min. | Carrier gas composition, mole percent | | Retention time, minutes | |
|---|---|---|---|---|
| | $H_2$ | $C_2H_6$ | Radioethane | Ethane |
| 23.20 | 1.0 | 0 | 2.73 | 2.50 |
| 20.33 | 0.862 | 0.138 | 3.05 | 2.54 |
| 21.67 | 0.374 | 0.626 | 2.77 | 1.60 |
| 23.40 | 0.062 | 0.938 | 2.56 | 4.00 |

From the foregoing description of the invention, it will have become apparent that a valuable new technique of gas chromatography is provided by the present invention. The separation of compounds otherwise inseparable by the use of a particular chromatographic column which contains a substrate exhibiting substantially equal sorptive affinity for the compounds can be effected by the simple procedure of making one of the compounds a portion of the continuously flowing carrier gas which moves the materials through the column. In addition to the specific uses of the procedure hereinbefore described, it can also be made to play a valuable role in the analysis of a vaporizable mixture of which only one of the components is of known chemical character. Thus, by the inclusion of this one component in a carrier gas used to move the vaporized mixture through a column containing a substrate demonstrating some sorbtive affinity for the various components of the mixture, the mixture can be resolved by the column, the individual components collected, and then subjected to individual analyses.

What is claimed is:

1. In the method of separating a vaporous sample into a plurality of components by moving said sample through a chromatographic column containing a sorbing substrate material and using a carrier gas to displace the sample through the column, wherein at least two of said components would otherwise have substantially identical retention times in said column, the improvement comprising:
    (a) introducing to the column a carrier gas mixture comprising a gaseous component corresponding to one of said components having substantially identical retention times and a carrier gas not a component of the sample to be separated;
    (b) introducing to the column the sample to be separated while the carrier gas mixture continues to flow therethrough and;
    (c) separating the components of the sample from the carrier gas emerging from the column and from each other.

2. In the method of separating a vaporous sample into a plurality of components by moving said sample through a chromatographic column containing a sorbing substrate material and using a carrier gas to displace the sample through the column, wherein at least two of said components would otherwise have substantially identical retention times in said column, the improvement comprising:
    (a) introducing continuously to the column in advance of the placing of the sample in the column a carrier gas mixture comprising a gaseous component corresponding to one of said components having substantially identical retention times and a carrier gas not a component of the sample to be separated;
    (b) introducing to the column the sample to be separated after a condition of thermodynamic equilibrium has been substantially obtained in the column and while the carrier gas mixture continues to flow therethrough;
    (c) separating from the carrier gas emerging from the column, and from each other, the components of the sample;
    (d) continuously adding a portion of at least one of the separated components of the sample corresponding to said component of step (a) to the carrier gas after the separation effected in step (c); and
    (e) continuously recycling to and through the column, the carrier gas mixture resulting from the addition of said separated component as specified in step (d).

3. The improvement defined in claim 2 wherein said carrier gas includes a major portion of a gas which is not sorbed on said substrate.

4. The improvement defined in claim 2 wherein the portion of said separated component which is continuously added to said carrier gas is added to produce a constant quantitative ratio with respect to the gases in said carrier gas mixture.

5. The method of analyzing a vaporizable mixture containing at least two components difficulty separable from each other chromatographically comprising:
    (a) qualitatively identifying one of the said difficulty separable components of the mixture;
    (b) preparing a chromatographic column containing a substrate which will sorb the components of the mixture;
    (c) preparing a carrier gas which includes in admixture, said identified component and an inert gas which is not sorbed by the column substrate;
    (d) passing the carrier gas continuously through the chromatographic column;
    (e) after equilibrium is established in the column between the sorbed and non-sorbed portions of the flowing carrier gas, positioning a portion of the vaporizable mixture in the flowing carrier gas in the column with the mixture in the gaseous state;
    (f) collecting in sequence, and in individual isolation, a plurality of the components of the mixture as they emerge from the column; and
    (g) determining the quantity and quality of each of the collected components of the mixture.

6. The method of controlling the sequence and time of emergence from a chromatographic column containing a sorbent substrate of components of a vaporized mixture injected thereinto in a continuously flowing carrier gas, said mixture containing at least two components difficultly separable from each other chromatographically, which comprises;
    (a) preparing a carrier gas comprising a known percentage of one of said difficultly separable components of said mixture and a gas other than the component of the mixture;
    (b) displacing a finite amount of said difficultly separable component used in the carrier gas through said chromatographic column by continuously flowing said carrier gas through the column, said displacement being carried out until a condition of thermodynamic equilibrium exists in the column between the sorbed and non-sorbed portions of the carrier gas;
    (c) determining the amount of said difficultly separable component sorbed on the column substrate during the displacement of said finite amount of said component through the column;
    (d) repeating steps (a) through (c) to obtain data sufficient to permit a sorption isotherm to be plotted in which the quantity of said component sorbed is plotted against the quantity of said component in the gaseous phase, the velocity of carrier gas through said column being retained substantially constant during each repetition of step (b); and
    (e) determining from said isotherm plot, the amount of said component which must be included in said carrier gas to cause said component and another component of said vaporized mixture to move at different pre-selected velocities through said column when a carrier gas comprising said determined amount of said component and said gas other than said component are used to displace said mixture through said column;

(f) preparing a carrier gas comprising said determined amount of said difficultly separable component and said gas other than a component from said mixture;

(g) continuously flowing the carrier gas prepared in step (f) through said colum; and (h) after equilibrium is established in the column between the sorbed and non-sorbed portions of the flowing carrier gas prepared as specified in step (f), positioning a portion of the vaporized mixture in the flowing carrier gas in the column, and displacing it therethrough with the carrier gas prepared in step (f).

References Cited

UNITED STATES PATENTS

| | | | |
|---|---|---|---|
| 3,319,458 | 5/1967 | Curren | 73—23.1 |
| 3,374,607 | 3/1968 | Fisher et al. | 55—197 |

FOREIGN PATENTS 692,119   8/1964   Canada.

REUBEN FRIEDMAN, Primary Examiner

J. L. De CESARE, Assistant Examiner